Jan. 15, 1952  R. V. MATHEWS  2,582,641
STORAGE BIN STRUCTURE
Filed Aug. 3, 1948
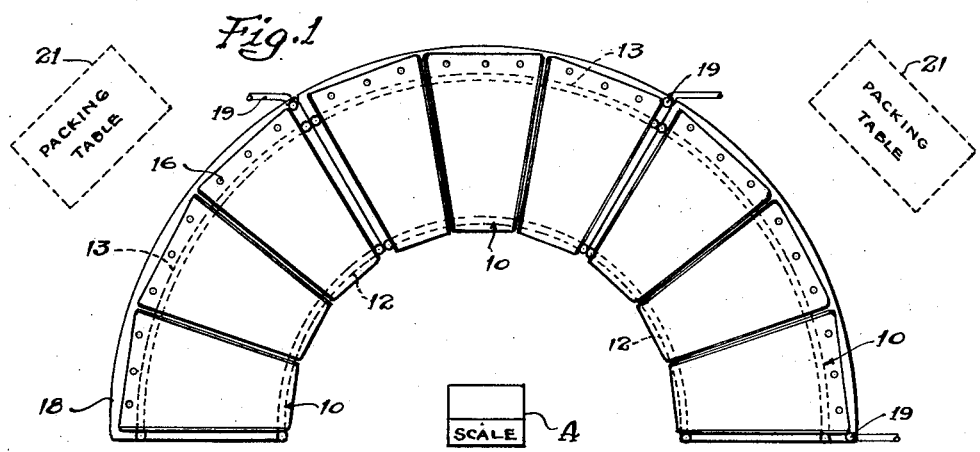
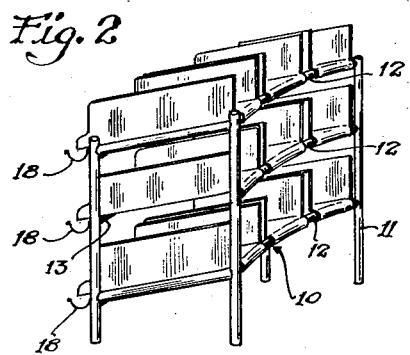
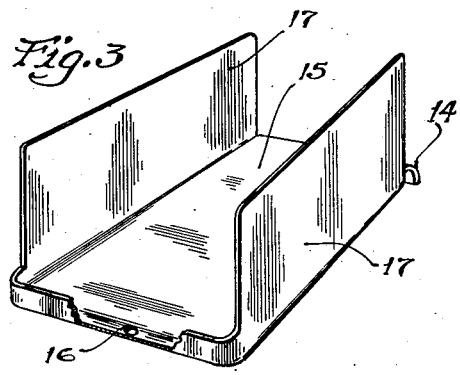
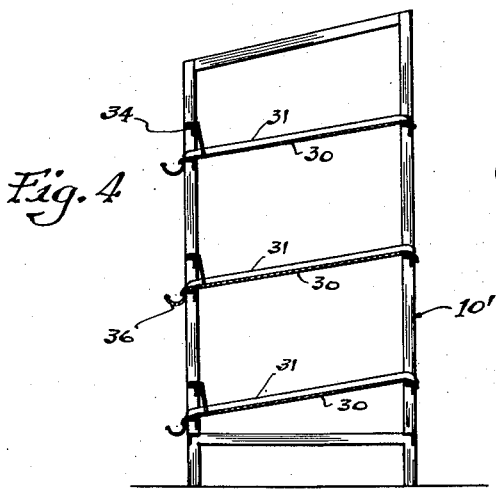
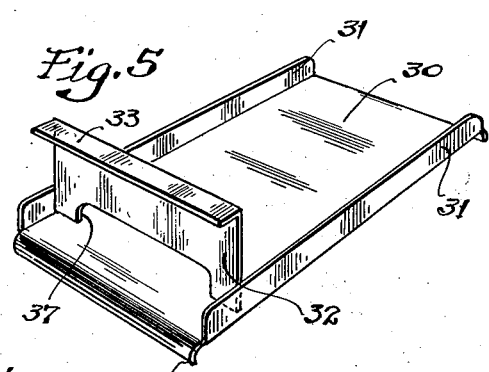
INVENTOR.
Ray V. Mathews
BY
R. L. Story
ATTORNEY Patented Jan. 15, 1952

2,582,641

UNITED STATES PATENT OFFICE 2,582,641

STORAGE BIN STRUCTURE

Ray V. Mathews, Ottumwa, Iowa, assignor to Swift & Company, Chicago, Ill., a corporation of Illinois Application August 3, 1948, Serial No. 42,213

1 Claim. (Cl. 211—126)

This invention relates to a poultry handling apparatus and more particularly to means useful in the steps of sorting and packaging dressed poultry at large poultry packing plants.

It is an object of this invention to provide improved means to facilitate the handling of dressed poultry products.

It is another object of this invention to provide improved temporary storage means wherein dressed poultry product may be stored after the weighing and grading operations.

Another object of this invention is to provide an improved storage and draining bin structure.

Another object of this invention is to provide an improved form of removable storage bin.

Another object of this invention is to provide a plurality of storage compartments arranged in an approximate semi-circle around a weighing and grading station.

Still another object of this invention is to provide an improved storage means for use in the weighing and grading of poultry products which occupies a minimum of space and has a large volume of storage capacity.

Another object of this invention is to provide a compactly arranged storage means for use during the weighing and grading of individual poultry carcasses.

Other objects will appear from the specification below.

In the drawings:

Figure 1 is a plan view of the preferred form of the invention, showing the several sections in assembled position;

Figure 2 is a perspective end view of one of the sections of the structure shown in Figure 1;

Figure 3 is a perspective view of an individual pan structure adapted to be used in the structure of Figure 1;

Figure 4 is a sectional end elevation of a modified form of the invention; and

Figure 5 is a perspective view of a modified form of a pan adapted to be used in the structure shown in Figure 4.

Modern developments in the poultry industry have led to mass production methods, and this invention has been made to facilitate the weighing and grading operation which must be rapidly performed to render mass production methods practical. Each carcass must be graded as to a number of characteristics, such as the weight, the color, the finish, the configuration, etc., and in the ordinary grading scale for large operations, there may be more than 30 different classes set up. However, since the bulk of poultry products follows a seasonal variation in weight, usually no more than 25 or so grades are used in the sorting process during any one season of the year.

This invention is designed to speed up this sorting or grading operation and makes it possible for one operator, skilled in the art of grading poultry, to keep up with the flow of product coming from the dressing lines in an ordinary plant. The structure preferably is positioned in a semicircle around a weighing scale and provides a rack which supports a plurality of individual bins for receiving the graded product. The bins are constructed so as to permit the draining of the wash water from the carcasses while temporarily storing them during the grading operation, and as the bins become filled, they are removed and carried to a packaging station, whereupon an empty bin is put in its place.

The preferred form of the invention is shown in Figures 1, 2, and 3 wherein a plurality of segmentally shaped racks are placed side by side to form a semicircle around the weighing and grading station A. The rack 10 takes the form of a plurality of vertical leg elements 11 which support horizontal bars 12 and 13 designed to carry the individual bins. The bins may take the form shown in Figure 3 and have a hooked lip 14 at the front end, which is adapted to fit over a cooperating horizontal bar 12 to position the bin in the rack. The bin is of a length to extend across the rack, and its opposite end bears on the horizontal bar 13 at what may be termed the back side of the rack structure. The bar 13 is disposed somewhat below the level of bar 12, and thus the floor 15 of the bin slopes downwardly. The floor of the bin is provided with suitable drain openings 16 at its lowermost end for drawing off wash water from the poultry product. The bins also are formed with side walls 17, but the front and back ends are open so that poultry carcasses may be quickly inserted into or withdrawn from the bin.

The rack structure has a drain system that cooperates with the drain openings 16 in the pans. For this purpose, gutters 18 are fixed to the back of the racks to collect the drippings and convey them to suitable drain outlets 19.

Each rack structure 10 is made up of 9 bins arranged 3 rows deep and 3 rows wide. A plurality of racks may be positioned side by side, as shown in Figure 1, and preferably 3 racks are situated together to form substantially a semicircle. With this arrangement the grading station may be disposed at the center of the circle, and individual carcasses may be weighed and quickly graded as to the various individual characteristics suggested above. As the product is graded, it is quickly tossed into the bin designated for the particular grades. Whenever an individual bin is loaded, the bin may be removed and carried to a suitable packaging table 21, which is conveniently positioned at the back side of the rack structure. Any conventional form of packing table may be used which is adapted to hold a wire-bound box and suitable lining paper rolls.

A modified form of this invention is shown in Figure 4 wherein the rack 10' may be made up of an angle iron structure. The rack is formed in the same segmental shape as the rack shown in Figure 1 so that a plurality of the racks may be positioned side by side to occupy a semicircular arrangement around a grading station.

In the form of the invention shown in Figure 4, a modified bin structure is provided, as best shown in Figure 5. This bin takes the form of a floor 30, having stiffening edges 31 formed thereon and having a back wall 32 that has a lip 33 which overhangs a supporting bar 34 fixed across the back side of the rack 10'. The floor 30 is also provided with an overhanging edge 35 at its back end, which is positioned over the drain gutter 36 when the pan is positioned in the rack. A suitable drain opening 37 is provided between the floor 30 of the pan and the back wall 32, so that carcasses stored in the bin may drain properly while temporarily stored therein.

The storage bin structure shown in Figures 4 and 5 is designed to be used exactly like that described above in connection with the arrangement shown in Figure 1.

As above described, either of these poultry-grading bins may be positioned around a scale so that individual carcasses may be rapidly weighed and graded for distribution to the proper bin for classification. All of the bins for the individual classes are disposed about the same distance away from the operator, so that a minimum effort is required to deliver the graded product into its proper bin. Also, due to the semicircular arrangement, a maximum storage volume is provided when using segmentally shaped storage bins. The final packing operation is thus speeded up, as all of the product, in any one bin, is all of the same size and grade. With this arrangement, a wire-bound box of proper size can be selected whereby more efficient packaging and use of shipping facilities can be made.

The above description covers the preferred form of this invention. Modifications will occur to those skilled in the art, all of which fall within the scope of the following claim.

I claim:

A storage bin structure for use in conjunction with a poultry weighing and grading station comprising an arcuate frame and a plurality of bins therefor; said frame comprising a plurality of segmental sections each composed of a plurality of vertical side and horizontal front and back rails, each of said front rails being shorter than the back rails, each of said front rails being mounted at a greater elevation than the corresponding back rail, an arcuate gutter positioned on said frame immediately below and behind each of said back rails; each of said bins comprising a segmentally-shaped pan open at the front, top, and back thereof, stop means positioned at the back of said bins, said bins being narrower at the front than at the back and adapted to rest upon the respective front and back horizontal rails of said frame, said bins being a fractional width of the frame segment whereby the frame will accommodate a given number of said bins, frame engaging means positioned at the front of each bin to hold the bin in place on the frame, and a drain opening at the rear of said bins adapted to feed into said arcuate gutter on said frame.

RAY V. MATHEWS.

REFERENCES CITED

The following references are of record in the file of this patent:

UNITED STATES PATENTS

| Number | Name | Date |
| --- | --- | --- |
| 808,318 | Thomas et al. | Dec. 26, 1905 |
| 1,018,637 | Shults | Feb. 27, 1912 |
| 2,108,122 | Hall | Feb. 15, 1938 |
| 2,119,640 | Lundell | June 7, 1938 |
| 2,362,532 | Bilek | Nov. 14, 1944 |